(12) United States Patent
Adrian et al.

(10) Patent No.: US 10,089,475 B2
(45) Date of Patent: Oct. 2, 2018

(54) DETECTION OF SECURITY INCIDENTS THROUGH SIMULATIONS

(71) Applicant: SAP SE, Walldorf (DE)

(72) Inventors: Maximilian Adrian, Bad Schoenborn (DE); Maxym Gerashchenko, Heidelberg (DE); Juri Frommer, Darmstadt (DE); Bjoern Brencher, Walldorf (DE)

(73) Assignee: SAP SE, Walldorf (DE)

( * ) Notice: Subject to any disclaimer, the term of this patent is extended or adjusted under 35 U.S.C. 154(b) by 214 days.

(21) Appl. No.: 15/361,288

(22) Filed: Nov. 25, 2016

(65) Prior Publication Data

US 2018/0150638 A1    May 31, 2018

(51) Int. Cl.
    *G06F 21/57*    (2013.01)

(52) U.S. Cl.
    CPC .................. *G06F 21/577* (2013.01)

(58) Field of Classification Search
    CPC ........................................... G06F 21/577
    USPC ........................................... 726/25
    See application file for complete search history.

(56) References Cited

U.S. PATENT DOCUMENTS

| | | | | |
|---|---|---|---|---|
| 8,622,809 B1* | 1/2014 | Arora | ................. | G07F 17/3258 463/20 |
| 8,874,951 B1* | 10/2014 | Chuang | ............. | G06F 17/30206 709/204 |
| 8,924,269 B2* | 12/2014 | Seubert | ................. | G06Q 10/06 705/35 |
| 9,110,496 B1* | 8/2015 | Michelsen | ............... | G06F 1/00 709/204 |
| 9,329,842 B1* | 5/2016 | Chan | ..................... | G06F 11/368 709/204 |
| 9,811,668 B2* | 11/2017 | Sabetta | ................ | G06F 21/577 709/204 |
| 2004/0193763 A1* | 9/2004 | Iizuka | .................. | G06F 13/385 710/52 |
| 2008/0209276 A1* | 8/2008 | Stubbs | ............... | G06F 11/3688 714/38.14 |
| 2010/0074238 A1* | 3/2010 | Qian | ................... | H04L 41/0823 370/338 |
| 2011/0083122 A1* | 4/2011 | Chen | ................... | G06F 11/3664 717/124 |
| 2012/0063743 A1* | 3/2012 | Bratton | ............. | H04N 21/4307 386/248 |
| 2012/0231441 A1* | 9/2012 | Parthasarathy | .......... | G09B 7/02 434/362 |

(Continued)

*Primary Examiner* — Haresh N Patel
(74) *Attorney, Agent, or Firm* — Buckley, Maschoff & Talwalkar LLC

(57) ABSTRACT

A virtual testing environment VTE is instantiated for automated measurement of performance of a security monitoring system (SMS). Predefined attacks are executed against a cloned version of a monitored system in the VTE. The predefined attacks are defined at an attack catalog. Based on an execution result of the predefined attacks, a detection rate of the SMS at the VTE and a protection level of the cloned version of the monitored system are measured. Based on the detection rate and the protection level, an action for improving SMS and the protection of the monitored system is determined. Based on the determined action, logic modifications related to SMS and improvement on protection measures for the monitored system are performed.

20 Claims, 6 Drawing Sheets

(56) References Cited

U.S. PATENT DOCUMENTS

| | | | |
|---|---|---|---|
| 2013/0010950 A1* | 1/2013 | Kerschbaum | H04L 9/008 380/30 |
| 2013/0333026 A1* | 12/2013 | Starink | H04L 63/0281 726/22 |
| 2013/0333028 A1* | 12/2013 | Hagar | H04L 63/0236 726/22 |
| 2014/0211944 A1* | 7/2014 | Hayward | H04L 9/0866 380/281 |
| 2015/0058627 A1* | 2/2015 | Paffel | G16H 10/60 713/168 |
| 2015/0067399 A1* | 3/2015 | Jaroker | G06F 11/2294 714/37 |
| 2015/0106624 A1* | 4/2015 | Gero | H04L 9/0643 713/171 |
| 2015/0317316 A1* | 11/2015 | Ghanekar | G06F 17/30864 707/706 |
| 2015/0324361 A1* | 11/2015 | Glass | G06F 17/3053 707/748 |
| 2015/0381653 A1* | 12/2015 | Starink | H04L 63/1408 726/22 |
| 2016/0048442 A1* | 2/2016 | Chirravuri | G06F 11/3664 705/40 |
| 2016/0110646 A1* | 4/2016 | Somekh | G06N 5/04 706/46 |
| 2016/0254982 A1* | 9/2016 | Kuznetsov | H04L 41/04 709/224 |
| 2016/0275569 A1* | 9/2016 | Zheng | G06Q 30/0277 709/204 |
| 2016/0283585 A1* | 9/2016 | Zheng | G06F 17/30675 709/204 |
| 2016/0330219 A1* | 11/2016 | Hasan | G06N 99/005 709/204 |
| 2016/0350400 A1* | 12/2016 | Zhu | G06F 17/30616 709/204 |
| 2016/0352521 A1* | 12/2016 | Choi | H04L 9/3247 709/204 |
| 2017/0054615 A1* | 2/2017 | Wilson | H04W 4/029 709/204 |
| 2017/0104592 A1* | 4/2017 | Merdinger | H04L 9/0819 709/204 |
| 2017/0147694 A1* | 5/2017 | Jiang | G06F 17/30867 709/204 |
| 2017/0169379 A1* | 6/2017 | Horseman | G16H 10/20 709/204 |
| 2017/0262469 A1* | 9/2017 | Ganti | G06F 17/30215 709/204 |
| 2017/0279611 A1* | 9/2017 | Kraemer | H04L 9/3221 709/204 |
| 2017/0324812 A1* | 11/2017 | Stute | G06F 17/30584 709/204 |

* cited by examiner

DETECTION OF SECURITY INCIDENTS THROUGH SIMULATIONS

BACKGROUND

Security monitoring systems (SMSs) are systems associated with a set of analytics patterns concerned with information technology (IT) related security risks. SMS are often installed for companies' IT infrastructure and critical IT systems in the company's landscape in order to detect security incidents and safeguard the company's information. SMS may be configured to monitor specific areas, such as network traffic, or monitor exchange or modification of internal and confidential information. Different monitoring technologies may be utilized. SMS can have a large variety of areas for monitoring with different scope (e.g. database (DB), operating system (OS), and/or network and network traffic, etc.) or be focused on specific layers or technologies (e.g. business process monitoring).

Such SMSs may be trained to perform analysis over stored content related to monitored system. Some monitoring technologies may use a generic anomaly based approach to detect suspicious activities, other monitoring technologies may use a pattern based scanning approach. A combination of both these approaches may be used. Alerts raised by the detection of suspicious activities may require manual evaluation. Such alerts may be processed in a formal manner depending on specific legal obligations and negotiated terms. Effective security monitoring is related to a large amount of resources spent, including effort for setting up the SMSs and continuous improvement of the detection mechanism utilized.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Figure 1:
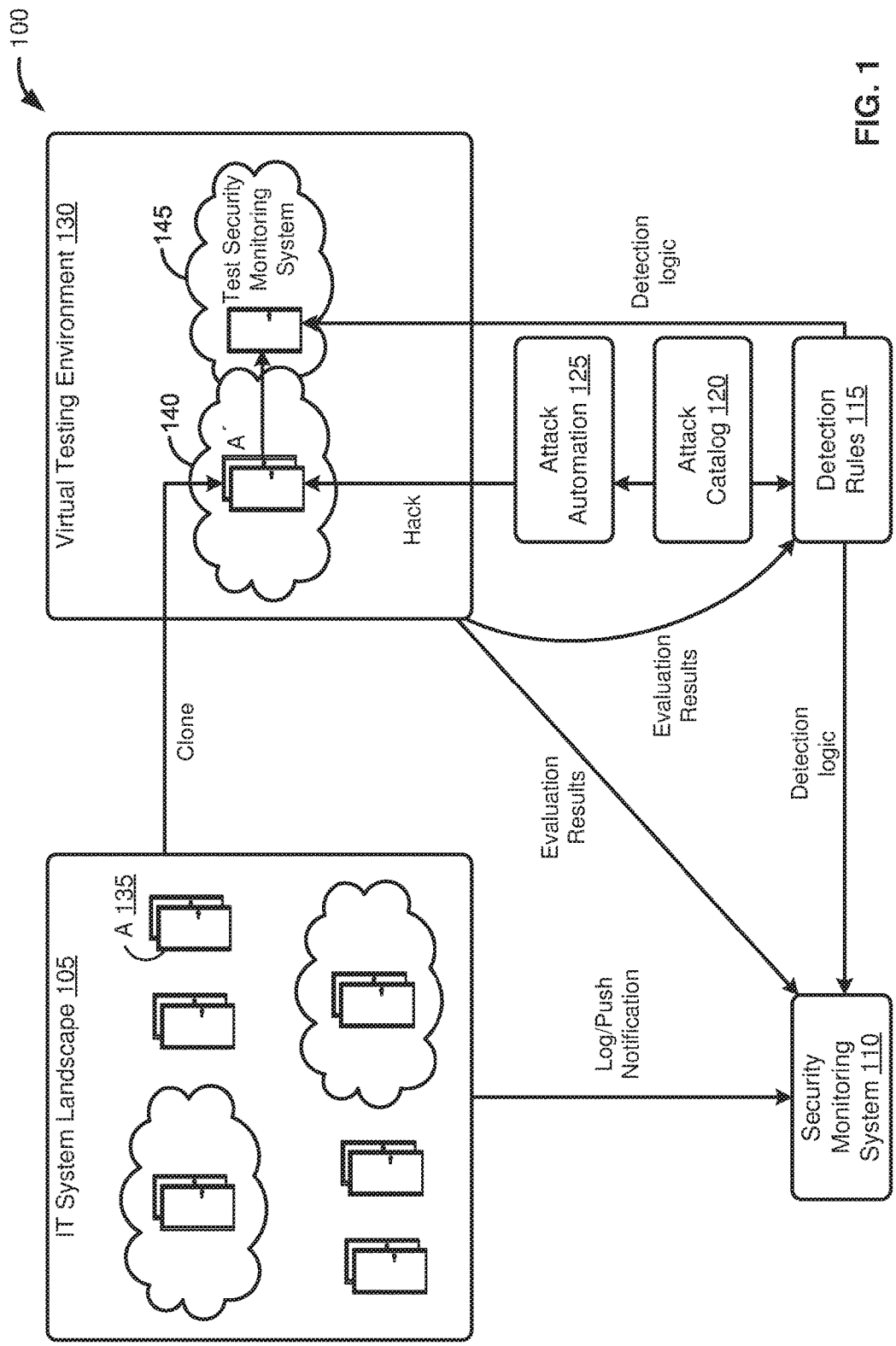
FIG. 1 is a block diagram illustrating a system for refining security protection mechanisms for detecting security incidents in monitored systems from IT environment, according to one embodiment.

Embodiments of techniques for improved detection of security incidents through simulations in a testing system environment are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Providing effective security monitoring over systems in a customer's IT environment may require high demand for manual effort for setting up a security monitoring system (SMS) and performing related operations. The number of cyber-attacks is rising in volume and finding a way to reduce effort and costs spent in association with the SMS may represent a challenge. Evaluation of new defined attacks and their possible impact may be a basis for improvement in the SMS, where new preventive or detective protection mechanisms may be derived and applied.

IT System Landscapes may have high complexity and include a large diversity of software business solutions, hardware, infrastructure, etc. Protection of the whole environment may be very expensive. Therefore, in addition to providing protection measures associated with the IT landscape itself, there may be provided smart security solutions offering high security level to critical systems and infrastructure from the IT landscape. Systems from the IT System Landscape may be monitored through SMS to detect security incidents and react accordingly. To avoid interruptions or other impacts on monitored IT systems, which are in a productive state in IT System Landscape, the systems may be cloned or copied to a Virtual Testing Environment (VTE). The monitored system from the productive IT System Landscape may be connected to a virtualized clone and/or a reference instance of a security monitoring system in the VTE. A regular execution of a sequence of predefined attacks may be executed in the VTE against the clones of the monitored system. Based on the execution of the predefined attacks, a simulation of a productive environment associated with security treats is performed. Based on the performed simulation, a measurement of the performance of the monitored systems in relation to security levels and performance of the security monitoring system to detect the attacks at the VTE is performed. The execution of the predefined attacks and the measurement may be performed automatically and the results of attacks and related monitoring activities may be documented. The obtained data from the virtual testing environment may be utilized to improve the security monitoring system and attached systems in the productive IT System Landscape.

FIG. 1 is a block diagram illustrating a system 100 for refining security protection mechanisms for detecting security incidents in monitored systems from IT environment, according to one embodiment. An IT System Landscape 105 includes a set of interconnected IT components and systems, which are sending logs to a security monitoring system (SMS) 110. The interconnected IT components and systems may be connected to the SMS 110 via active software components taking roles of agents. The IT System Landscape 105 may contains layers, such as physical and virtualized network and system infrastructure, operating systems, databases, application servers, and/or applications.

The SMS 110 is a system used to detect attacks and threats to elements of the IT System landscape 105. The SMS 110 and the IT System Landscape 105 are running in productive mode while serving user's requests and detecting attacks and threats to protect the elements of the IT System Landscape 105. A Virtual Testing Environment (VTE) 130 is set up to test security protection of systems from the IT System Landscape 105 and to test performance of the SMS 110 in a non-productive testing environment. Therefore, the VTE 130 is defined to include replications of systems from the IT System Landscape 105 and also a test security monitoring system (SMS) 145. The VTE 130 may be a cloud-based environment, which is automated in order to allow the creation of the virtual test instances from snapshots or instances with a reference configuration. Test systems, replications of systems from the IT System Landscape 105, are created at the VTE 130. System A' 140 is created based on an actual system A 135 from the IT System Landscape 105. System A' 140 is a cloned version of the system A 135, which is created in the VTE 130 for testing purposes. There may be different manner to create a test system in the VTE 130. In one example, a system snapshot containing productive data may be created in the VTE. In such manner, a lot of resources and time may be consumed for replication, but the resulting system generated at the VTE 130 may provide same results as a referenced system from the IT System Landscape. In a second example, a snapshot may be created with an optimized snapshot size, which is performed through reducing the amount of the productive data. In such manner, a lower amount of transferred data is generated. In a third example, a new system may be built with reduced hardware capacity and simulated content, but including the same configuration as the reference system from the IT System Landscape 105. The third option may have some variation of test results compared to the first two options from the two previous examples. However, through the third option, results may be acquired faster and cheaper with respect to hardware, software resources, and time spent. In one embodiment, the sizing of computation capabilities for the VTE 130 may depend on selected options for test system creation and the size of the IT System Landscape 105. For each system type an individual test schedule may be created. For example, for training systems—every month, for development systems—every week, for core business systems—every day or even more often, etc.

In one embodiment, to perform testing of systems from the IT System Landscape 105 in relation to security issues and performance of the SMS 110, attack simulations may be performed at the VTE 130. At the VTE 130, the performance of the test SMS 145 may be tested, where the test SMS 145 includes logic for detection of security incidents corresponding to the logic implemented in the SMS 110. The test SMS 145 may further include additional logic for detecting security incidents, which is not yet included in the SMS 110, as such additional logic may be under evaluation within the VTE 130. The VTE 130 may be used for simulation of security attacks and analyzing attack results based on the performance of the tested systems and the test SMS 145.

In one embodiment, to simulate attacks and generate test results at the VTE, the test SMS 145 is associated with Detection Rules 115, an Attack Catalog 120, and an Attack Automation 125 component. Detection Rules 115 component includes a set of rules to detect attacks to systems from the IT System Landscape 105. The Detection Rules 115 may further include rules that are not utilized by the SMS 110 in a productive manner as they are under an evaluation and testing cycle. Such evaluation of additional rules may be performed through simulation of attack scenarios in the VTE 130. These rules may be reference values, pattern based or generic like automated anomaly detection. For example, one rule may be related to one attack vector from an Attack Catalog 120 and causes one alert in case of an attack.

The Attack Catalog 120 may include information records about methods and vulnerabilities applicable for specific system types. One record is reflecting one attack vector and may include a chain of steps required for execution of an attack. The Attack Automation 125 component includes a collection of scripts, which may be used to automate required steps to perform an attack execution. The Attack Automation 125 component may further include implementation logic to collect and document attack results. The attack results are generated based on execution of attacks from the Attack Catalog 120 on test systems from the VTE 130, such as test system A' 140.

In one embodiment, the Attack Catalog 120, the Attack Automation 125 component, and Detection Rules 115 may be defined as independent components, but may also be implemented as part of an independent system, and/or may be implemented as components or a system a part of the SMS 110. In one embodiment, a mechanism for data exchange may be implemented for system 100, which may facilitate the data exchange between the components of the system 100 and access of the VTE 130 may be provided to other components of the system 100. Through system 100, a justification of operations of the security monitoring system 110, through simulation and testing in the VTE 130 may be performed.

In one embodiment, after a test system, such as the system A' 140, is created, applicable attacks from the Attack Catalog 120 may be selected for execution. Information about potential attacks associated with systems from the IT System Landscape 105 is available in the Attack Catalog 120. The attack scenarios may be automatically performed through scripts, defined at the attack automation 125 component. When an automation script is not available, required steps to execute an attack may possibly be performed manually. During attacks execution at the VTE 130, the test SMS 145 is running to detect the attacks and may raise alerts related to the attacks. Results of attack detection activities may be documented and may be used later, when adjustment of the detection logic and/or new preventive measures are required.

After a number of attacks are performed, a detection rate of the test SMS and a protection level for the respective test system (e.g. system A' 140) may be computed. Both computed values may be used as key performance indicators (KPIs) for the SMS 110 and/or for system management reporting. After evaluation of a given test system at the VTE, the test system may be removed from the VTE 130 and VTE's infrastructure capabilities may be released for the next test system copy operation and next series of attack execution simulations.

Figure 2:
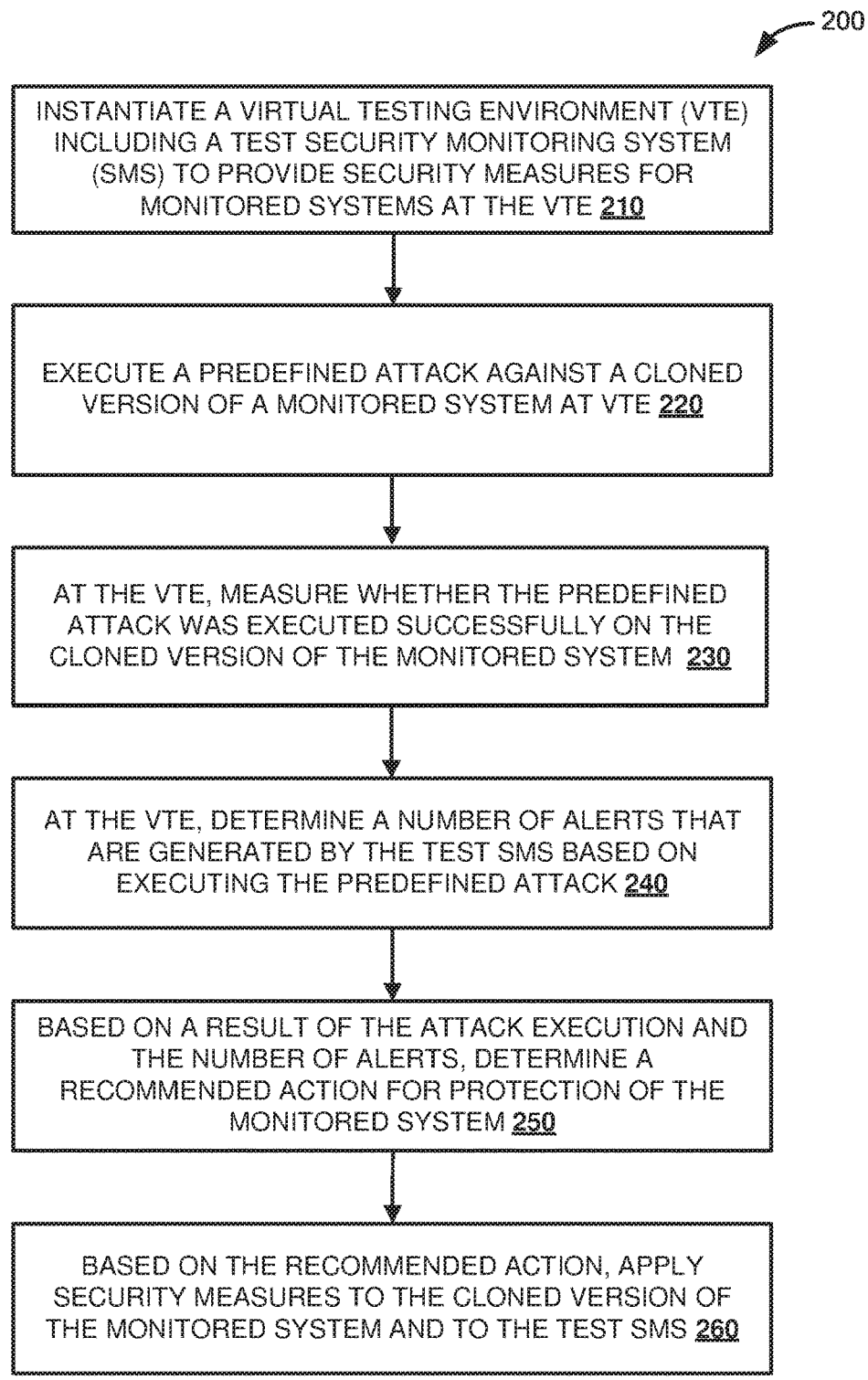
FIG. 2 is a flow diagram illustrating a process for detection of security incidents through a virtual testing environment, according to one embodiment.

FIG. 2 is a flow diagram illustrating a process 200 for detection of security incidents through a virtual testing environment, according to one embodiment. At 210, a VTE is instantiated. The VTE may be such as the described VTE 130 in relation to FIG. 1. The instantiated VTE includes cloned versions of monitored system from an IT System Landscape of an enterprise, such as the IT System Landscape 105, FIG. 1. The cloned versions of the monitored system at the VTE are test systems for the process of detection of attacks simulated in the test environment. The VTE further includes a test SMS which is corresponding to a SMS, which is used in relation to the IT System Landscape in productive scenarios. The test SMS at the VTE includes implementation logic for detecting security threats associated with test systems instantiated at the VTE. At 220, a predefined attack against a cloned version of a monitored system is performed in the VTE. The cloning of the monitored system may be performed as described in relation to FIG. 1. The predefined attack may be selected from an attack catalog, such as the Attack Catalog 120, FIG. 1. The predefined attack that is executed may be, for example, a hacking attack to threat secured resources at the cloned version of the monitored system. The execution of the predefined attack may simulate a productive scenario of a security attack in a productive IT System Landscape scenario. The test SMS at the VTE may utilize detection logic for detecting threats at monitored systems from the IT System Landscape. The detection logic at the test SMS may correspond to a detection logic defined for a production SMS utilized for the productive versions of the monitored systems at the productive IT System Landscape. The detection logic at the test SMS may further include additional detection logic, which is under an evaluation and testing phase at the VTE. The additional detection logic may be defined for performing testing activities over test systems as instantiated at the VTE.

At 230, at the VTE, it is measured whether the predefined attack was executed successfully at the cloned version of the monitored system. At 240, at the VTE, a number of alerts that are generated by the test SMS based on executing the predefined attack are determined. At 250, based on a result of the attack execution and the number of alerts, as determined at 230 and 240, a recommendation action for implementing additional protection of the monitored system (such as 135, FIG. 1.) and/or adjusting the logic of the productive SMS (110, FIG. 1) is determined. In one embodiment, the determination of the recommended action may be performed automatically based on a predefined implemented logic at the VTE. The automatic determination of a proposed action may be based on a decision matrix defining conditions for determining a recommended action. Table 1 includes an exemplary decision matrix that may be used to automatically determine recommended action based on the result of the attack execution and the number of alerts.

In one embodiment, the decision matrix, as presented in Table 1, is based on two variables. First variable is the question if an executed attack was successful. That gives insight on how good the monitored system is protected. Second variable is the number of alerts generated by the test SMS. With regards to a precision of the test SMS, one alert may be generated per attack—regardless whether the attack was successful or not. The recommended actions may include a recommendation such as to take no action, to perform an adjustment of the test SMS's logic to increase system's precision. Such adjustment may also be performed to the productive SMS logic, corresponding to the test SMS. The performed adjustment may include additional protection measures for the respective IT system to strengthen its security level, or a combination of the latter two options. The logic adjustment of the test SMS's logic (and respectfully to the productive SMS logic) may include definition of additional detection rules for already defined attacks at the attack catalog, and more specifically to the attack that is tested in the VTE environment with process 200, FIG. 2.

A recommendation for logic adjustment may be based on several reasons. For example, when a detection rule does not exist, when a detection rule does not work as expected, when the test IT system at the VTE is not connected to the test SMS, when the test IT system is connected to the test SMS but provides not enough data for a proper detection, when the test IT system is connected to the test SMS but detection rule is not active for the test IT system, others. Depending on an applied SMS technology, it may be possible to automatically send the proposals for logic adjustment to administrators of the SMS (both test SMS and productive SMS). For recommendations to apply additional protection, there may be no further details in relation to possible implementation actions to be undertaken. A decision to implement additional protective measures may be related to the business demand or may be compensated by measures not related to the system itself.

Computed attack result may be consolidated with other attack results from further attack executions at the VTE. The documented attack results may be transferred to the test SMS and presented there as part of status reports.

Table 2 represents an exemplary mapping of results, generated from the execution of the attacks against a cloned version of a monitored system at the VTE, to actions, as defined in the decision matrix in Table 1. The attack success is evaluated and a number of raised alerts is determined per attack. Automated recommendations for action according to the decision matrix presented in Table 1 are defined. Table 2 below presents an example of how the proposals are made according to the test results associated with attacks' execution.

TABLE 1

| Attack Success | Number of Alerts | Recommended Action |
|---|---|---|
| No | 1 | None |
| No | 0 or >1 | Logic adjustment |
| Yes | 1 | Additional protection |
| Yes | 0 or >1 | Additional protection & logic adjustment |

TABLE 2

| N | Attack | Attack Success | Number of Alerts | Proposed action |
|---|---|---|---|---|
| 1 | Standard User Brute Force | No | 5 | Logic adjustment |
| 2 | SQL injection | No | 1 | None |
| 3 | Misuse of administrative functionality | Yes | 1 | Additional protection |
| 4 | Exploit default password | Yes | 0 | Additional protection & logic adjustment |

TABLE 2-continued

| N | Attack | Attack Success | Number of Alerts | Proposed action |
|---|---|---|---|---|
| 5 | Unauthorized user management | No | 0 | Logic adjustment |
| 6 | Access from insecure systems to secure systems | No | 1 | None |

In one embodiment, a proposal for action may be presented for improvements of the SMS. The proposal for action may be presented for example as in Table 3, where proposed action is associated with a system, on which attacks were tested. These systems may be defined with criticality values, which may be further used to measure KPIs associated with the system. For example, 5 systems may be tested, denoted by S1, S2, S3, S4, S5, where these systems are cloned versions of systems in the VTE.

TABLE 3

| Proposed action | Attack Success | Number of Alerts | Systems |
|---|---|---|---|
| Logic adjustment | No | 5 | S2, S3, S4, S5 |
| Additional protection | Yes | 1 | S2, S3, S4, S5 |
| Additional protection & logic adjustment | Yes | 0 | S4, S5 |
| Logic adjustment | No | 0 | S4, S5 |

At 260, based on the recommended action, security measures to the cloned version of the monitored system and/or logic adjustments to the test SMS are applied. Such security measures may include logic adjustments to the protection logic of the SMS, and/or additional protection logic included in the implementation logic of the cloned version of the monitored system. If such security measures increase the protection of the cloned version of the monitored system, as determined at the VTE, then such security measures may be correspondingly applied to associated monitored system from the IT System Landscape and the SMS in productive environment.

Figure 3:
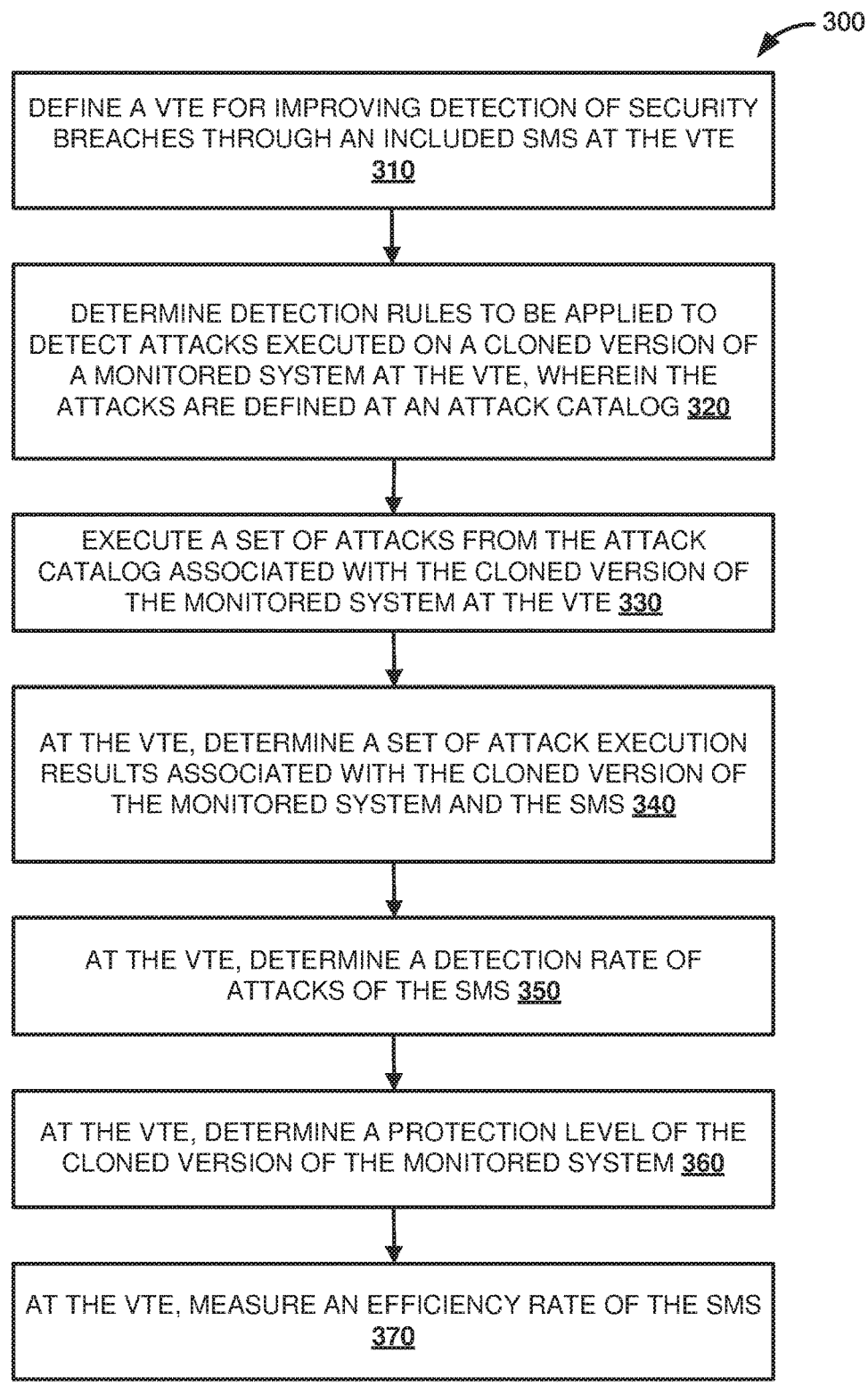
FIG. 3 is a flow diagram illustrating a process for measuring an efficiency rate of a security monitoring system through simulations in a virtual testing environment, according to one embodiment.

FIG. 3 is a flow diagram illustrating a process 300 for measuring an efficiency rate of a security monitoring system through simulations in a virtual testing environment, according to one embodiment. At 310, a VTE is defined for improving detection of security incidents through an included SMS. The VTE and the SMS may be such as the discussed VTE 130 and test SMS 145, FIG. 1, and the VTE and test SMS discussed in relation to FIG. 2. At 320, detection rules are determined. The detection rules are to be applied to detect attacks executed on a cloned version of a monitored system at the VTE. The monitored system may be a system from IT System Landscape of an enterprise, such as the IT System Landscape 105, FIG. 1. The attacks are defined at an attack catalog. The attacks may be automatically executed on the cloned version of the monitored system. The attack catalog may be such as the attack catalog 120, FIG. 1. The attacks may be executed by an attack automation component, such as the Attack Automation 125 component, FIG. 1. At the 330, a set of attacks from the attack catalog is executed. The set of attacks is associated with the cloned version of the monitored system at the VTE. The set of attacks may be selected based on a criterion of selection for execution corresponding to a given test scenario. The attack catalog may be updated on a regular basis with new definitions of attacks, and/or modifications to currently defined attacks, and/or deletion of defined attacks. At 340, at the VTE, a set of attack execution results is determined. The set of attack execution results is associated with the cloned version of the monitored system and the SMS. When the attacks are executed on the cloned version of the monitored system, then the protection logic defined for the monitored system, which is also present in the cloned version is activated to detect attacks. In addition to that, the SMS is providing protection for the systems defined in the VTE through detecting attacks. The SMS utilizes detection rules, such as the Detection Rules 115, FIG. 1, to detect attacks executed against cloned versions of systems at the VTE, including the cloned version of the monitored system.

At 350, at the VTE, a detection rate of attacks by the SMS is determined. Detection rate may be calculated for an IT system monitored at the VTE, for an attack, or for the whole IT System Landscape. While the first option of determining a detection rate may be of interest when generating frequent reports or for the user in the role of system owner, the other two options may be used to improve the SMS and may be associated with performing performance optimization within the IT System Landscape. The detection rate may be denoted by "D", and may be calculated according to a formula, that takes into account the number of attacks that are detected by the SMS, namely the successful attacks, and the number of the executed attacks. The formula, may be such as formula (1) as follows:

$$D=d/a, \qquad (1)$$

Where "d" is a natural number, $\{d \in N\}$, which represents a number of detected attacks and "a" is a natural number equal or greater than 1, $\{a \in N | a >= 1\}$, is the number of executed attacks.

At 360, a protection level of the cloned version of the monitored system is also determined at the VTE. The detection rate of the attack by the SMS is based on protection strength of the SMS at the VTE. The protection strength of the SMS at the VTE is related to a defined set of detection rules that is utilized by the SMS. The definition of the system protection level represents the ability of the monitored system to be resistant against security and cyber attacks. To determine the protection level, a formula, such as formula (2) may be utilized. The formula may be related to a number of executed attacks, a number of successful attacks against the cloned version of the monitored system, and a criticality factor defining the criticality of the monitored system for the IT System Landscape. Formula (2) defines how to compute a protection level P, where the result value "x" takes values between 0 and 1, $\{0 < x \le 1\}$.

$$P=i(a-b)^c/a^c, \qquad (2)$$

In formula (2), "a" is a natural number equal or greater than 1, $\{a \in N | a >= 1\}$, where "a" denotes the number of executed attacks. In formula (2), "b" is a natural number as well, $\{b \in N\}$, and denotes the number of successful attacks from the attacks executed against a system at the VTE. "c" in formula (2) is a natural number in the interval between 1 and 10, {c∈N|1<=c<=10}. "c" denotes the value defining the criticality of the system, which is monitored and tested at the VTE. "c" takes the value of 1, c=1, for less critical systems, and "c" takes the value of 10, c=10, for systems with a highest criticality The variable "i" in formula (2) is a real number, where "i" takes values between 0 and 1, {i∈R|0<=i<=1}. "i" denotes the value defining the integrity of the attack catalog. The integrity value "i" is defined in association with the completeness of the attack catalog applied to a test system, when determining the system's protection level "P". The integrity value "i" represents the rate of attacks considered in the attack catalog compared to the number of theoretically known attack scenarios for the test system's type. For example, for an exemplary system they are 100 different attack scenarios known, and in the attack catalog there are 60 attack definitions included. In that exemplary case, the integrity value "i" may be computed as a fraction of the defined attacks in the attack catalog (60) from the total amount of different known attack scenarios (100). Therefore, the integrity value "i" in the example is computed as follows: i=60/100=0.6. The integrity value "i" may be equal to zero, when there are zero attacks in the catalogue. The integrity value "i" may be equal to one, when the attack catalog includes attacks for known attack scenarios.

In one embodiment, a detailed status information for each system that is tested may be presented to an end user as a status report. Table 4 represents an exemplary report for tested systems in the VTE. The tested systems may be 5 systems, as those systems included in the example associated with Table 3. Table 4 includes definitions of the criticality of the system, together with measured protection level and detection level correspondingly associated.

TABLE 4

| System | System Criticality | Protection Level | Detection Level |
|---|---|---|---|
| S2 | Very High (10) | 0.32 | 98% |
| S3 | High (7) | 0.45 | 98% |
| S4 | Low (2) | 0.85 | 85% |
| S5 | Low (2) | 0.85 | 85% |

At 370, an efficiency rate of the SMS is measured at the VTE. The VTE includes additional logic for computation of key performance indicators (KPIs). Such KPIs include the detection rate of attacks by the SMS, the protection level of the cloned version of the monitored system, and the efficiency rate of the SMS, other.

Operations performed by the SMS may be expensive, including consuming a lot of hardware resources, computational time and effort. For example, assessments of generated alerts by the SMS may be very time consuming. One of the manners to measure efficiency of the SMS is to assess the generation of false positive alerts and alerts related to one and the same attack. The efficiency rate of the SMS may be measured through computations based on a formula, where the formula takes into account the number of detected attacks by the SMS, the generated false positive alert results, and the total number of alerts that are generated in relation to detected attacks. For example, the efficiency rate formula may be such as formula (3) as follows:

$$E_{SMS} = \frac{d}{(A_f + A_d)} \quad (3)$$

Where "d" is a natural number, {d∈N}, and "d" represents the number of detected attacks by the SMS, "$A_f$" is a natural number, {$A_f$∈N}, and "$A_f$" represents the number of false positive alerts that are generated by the SMS, and "$A_d$" is a natural number. {$A_d$∈N}, and "$A_d$" represents the number of alerts related to detected attacks.

The efficiency rate $E_{SMS}$ is an indicator, which when measured for the SMS allows a quick insight of an SMS's efficiency and tracking of efficient development of the SMS during a process of improving the provided capabilities by the SMS. It may be noted, that an extension of the attack catalog with definition of new attacks may have a negative impact on the measured value of the $E_{SMS}$. The measured value in such cases may be lower, as from statistical point of view, when a larger number of attacks are executed, then a larger number of attacks may not be detected. In such cases, one option is to define upfront an appointed value as a threshold and compare the measured value with the appointed value to propose action if the current $E_{SMS}$ value is lower than expected.

Figure 4:
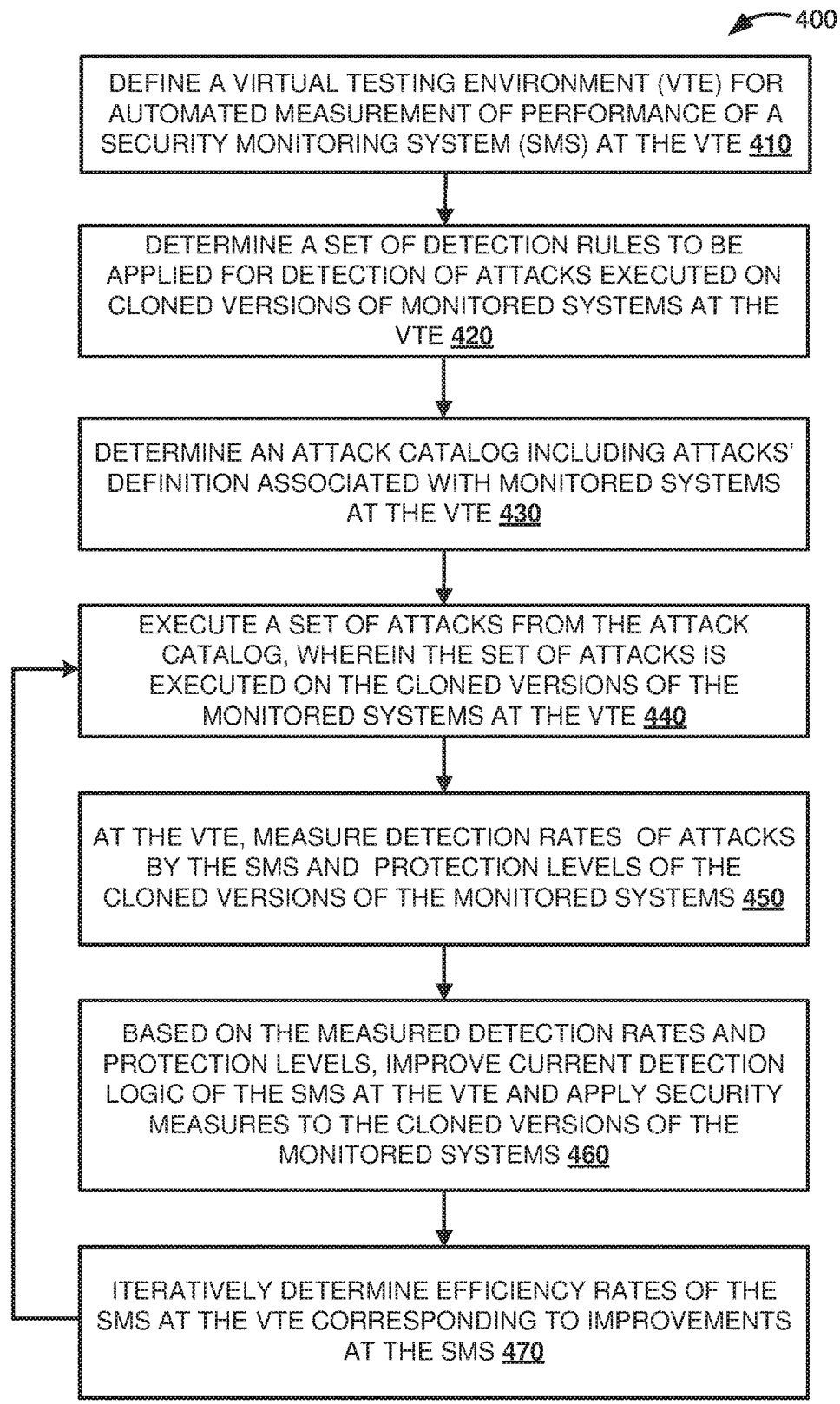
FIG. 4 is a flow diagram illustrating a process for improving detection of security incidents through simulations in a virtual testing environment, according to one embodiment.

FIG. 4 is a flow diagram illustrating a process 400 for improving detection of security incidents through simulations in a virtual testing environment, according to one embodiment. At 410, a VTE for automated measurement of performance of an SMS is defined. The VTE may be defined to replicate systems from an IT System Landscape and to define an environment to test and improve the performance of the SMS. The IT System Landscape may be a defined set of IT systems. Once there is a defined improvement associated with the SMS at the VTE, then such improvement may be applied to the productive version of the SMS in the IT System Landscape. At 420, a set of detection rules is determined to be applied for detection of attacks. The attacks are executed on cloned versions of monitored systems at the VTE. The attacks may be such as the attacks defined in the attack catalog 120, FIG. 1. The attacks may be executed by an attack automation module, such as the attack automation 125 component, FIG. 1. The set of detection rules includes detection rules, which are associated with the different attacks that are defined. One or more of the detection rules may be associated with one attack. There may be a defined one-to-many relationship between an attack and detection rules from the set of detection rules. The set of detection rules that are determined may correspond to the set of detection rules that may be used to detect attacks at the monitored system in a productive environment of the IT System Landscape. At 430, an attack catalog including attacks definition is determined. The attacks definitions are defined in association with the cloned versions of the monitored systems at the VTE. At 450, the detection rates of attacks by the SMS are measured. At 450, the protection levels of the cloned versions of the monitored systems at the VTE are also measured. The detection rates and the protection levels may be measured based on computation of formulas, such as formula (1) and (2) discussed above in relation to FIG. 3. At 460, based on the measured detection rates and protection levels, current detection logic of the SMS at the VTE may be improved. Further, security measures may be applied to the monitored systems. The detection logic of the SMS may be improved through defining additional detection rules that may be used when attacks are executed. Recommended actions may be provided based on the determined detection rates and protection levels. The recommended actions may be determined automatically based on a decision matrix, as suggested in Table 1 and in relation to FIG. 2. The recommendations for improvements of the security measures taken to protect the productive versions of the monitored system may include recommendations to perform an adjustment of the SMS's logic to increase system's precision when generating alerts in relation to executed attacks, and/or to include additional implementation logic in relation to further protection measures to strengthen the security provided by the SMS, or a combination. A refining of the detection rules may also be performed, or an improvement of the definition of the attacks to be executed. Further, an inclusion of new attacks that are associated with additional detection rules may be performed to improve current detection logic of the SMS. At 470, efficiency rates of the SMS are determined iteratively at the VTE to correspond to improvements at the SMS. At a first iteration, the efficiency rate of the SMS may be determined based on the results of the executions of the set of attacks, as defined in 440. The efficiency rate may be computed based on a formula, such as the formula (3) discussed above in relation to FIG. 3. Once a first efficiency rate is determined at 470, and an improvement of the current detection logic is performed (as defined at 460), a set of attacks, as defined at 440 may be executed, and a new measurement of KPIs (detection rates, protection levels, efficiency rates, etc.) may be performed. Therefore, through a sequence of iterations, it may be determined whether the performance of the SMS to detect security incidents is enhanced.

For example, a comparison of the performance of the SMS in two different consecutive steps of improvement, as suggested in process 400, may be associated with attack execution results and KPI measurement as presented in Table 5.

TABLE 5

| Topic | SMS | SMS improved (second iteration) |
|---|---|---|
| Executed attacks (a) | 48 | 48 |
| Detected attacks (d) | 28 | 48 |
| False positive alerts ($A_f$) | 8 | 0 |
| Alerts related to detection ($A_d$) | 68 | 48 |
| SMS detection rate (D) | 0.58 | 1 |
| SMS efficiency rate ($E_{SMS}$) | 0.37 | 1 |

Figure 5:
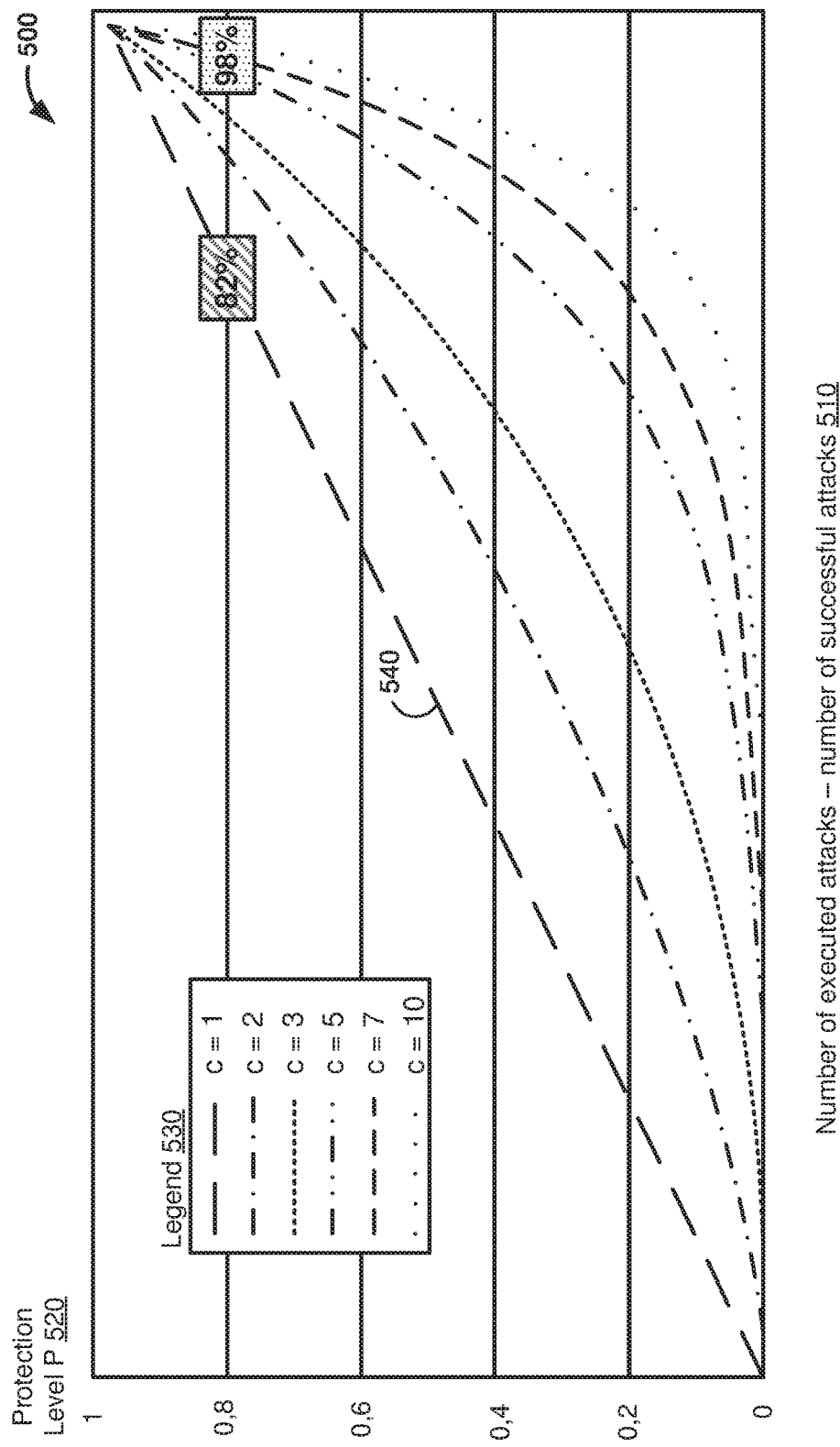
FIG. 5 is a block diagram illustrating an exemplary distribution of system protection levels with regards to different criticality values associated with measured systems, according to one embodiment.

FIG. 5 is a block diagram illustrating an exemplary distribution 500 of system protection levels with regards to different criticality values associated with measured systems, according to one embodiment.

The discussed processes at FIG. 3 and FIG. 4 define methods, which may facilitate usage of a common metric for systems with different criticality. The common metric may be for example in form of a traffic light notification system, with green, yellow and red lights corresponding associated with different threshold values. Systems with different criticality may be associated with a different demand for protection, and respectively different protection levels. In a first example, for an uncritical test system A with criticality value equal to 1 (c=1), where the integrity value of the attack catalog is equal to 0.98 (i=0.98) and a green light threshold is set to 0.8 of the protection level. In such first example, system A has to resist at least 82% of attacks to be rated as "green". In a second example, for a high critical productive system B, with criticality value equal to 10 (c=10), where the integrity value of the attack catalog is equal to 0.98 (i=0.98), and a green light threshold is 0.8 of the protection level. In such second example, system B has to resist at least 98% of attacks to be rated as "green".

FIG. 5 represents the difference in distribution of the protection level for systems with a different level of criticality. For systems with higher criticality, a higher level of protection measures is expected. The proposed value range for criticality in the range of 1 to 10 is exemplary and may be defined individually for an IT System Landscape according to unique individual requirements. The exemplary distribution 500 is presented on a coordinate system, where on the x-axis 510 it is presented the difference between the number of executed attacks and the number of successfully executed attacks, and on the y-axis 520, the protection level P is measured. The measurement of the protection level P may be according to formula (2), discussed above in relation to FIG. 3. The exemplary distribution 500 includes distribution of system protection levels having criticality values as defined in Legend 530. The Legend 530 defined how to distinguish the distributions to correspond to the different systems based on the different criticality. The curves presented on the diagram correspond to criticality values of 1, 2, 3, 5, 7, and 10, as presented with different curve lines. For example, curve 540 corresponds to a system with low criticality, equal to 1. If a threshold value is defined for the different system, then a corresponding protection level may be computed, as discussed above in relation to the proposed common traffic light notification system. The system corresponding to curve 540 may be such as the system A discussed above, which is an uncritical test system A with criticality value equal to 1 (c=1). When the integrity value of the attack catalog is equal to 0.98, and a green light threshold is defined to be 0.8, the uncritical test system A (corresponding to curve 540) with criticality value equal to 1 (c=1), may resists to at least 82% of attacks to reach P=0.8. Corresponding analogy may be performed for the system with criticality of 10 and the second example with system B discussed above.

Based on a computed system protection level P, a measurement of the protection level for the entire IT System Landscape, network segment or system group is possible. To calculate the protection level of the IT System Landscape, denoted by $P_L$, formula (4) may be utilized:

$$P_L = \Sigma_{i=1}^{n} P_s c_s^3 / \Sigma_{i=1}^{n} c_s^3 \quad (4)$$

Where "n" is the number of the considered systems, $P_s$ is the system protection level of the respective system, and $c_s$ is the criticality of the respective system. A KPI, such as the PL value may be used for a high level reporting or deviation of trends for a given IT System Landscape. Based on such high level reporting, additional details associated with included systems in the IT System Landscape may be requested to determine further actions for improving the protection levels.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
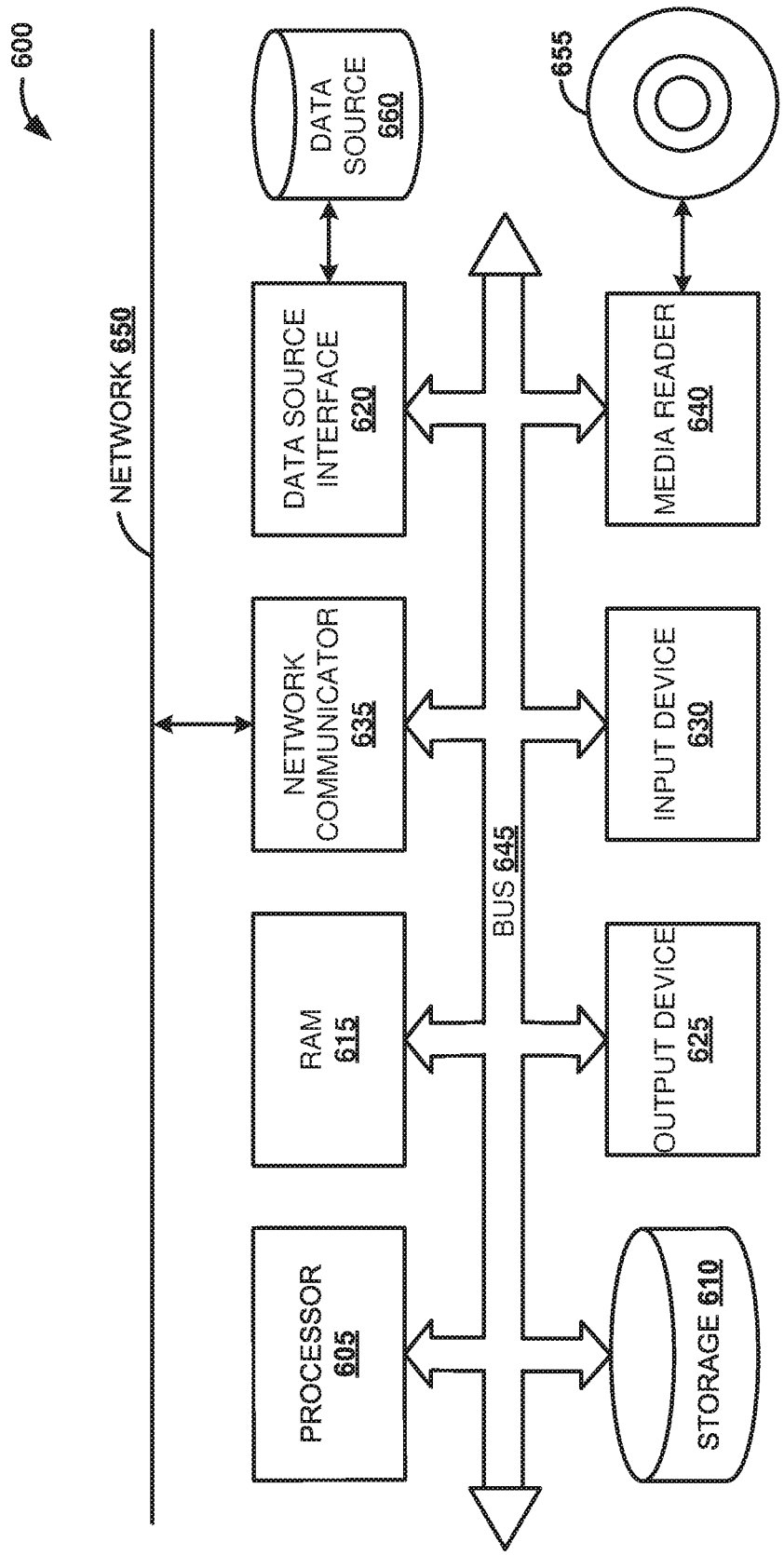
FIG. 6 is a block diagram illustrating an embodiment of a computing environment in which the techniques described for detection of security incidents can be implemented.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. These output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to improve detection of security incidents, the method comprising:
    executing a predefined attack against a cloned version of a monitored system in a virtual testing environment (VTE);

based on a result of execution of the predefined attack, measuring a detection rate of the predefined attack by a security monitoring system (SMS) at the VTE; and
measuring a protection level of the cloned version of the monitored system;
based on the detection rate and the protection level, determining an action to improve protection of the monitored system; and
based on the determined action, performing logic modifications on the SMS, where the logic modifications are associated with improved detection of security incidents.

2. The method of claim 1, further comprising:
instantiating the VTE for automated measurement of performance of the SMS.

3. The method of claim 2, wherein the predefined attack is a hacking attack associated with the monitored system as defined at an Information Technology (IT) System Landscape, and wherein the SMS at the VTE utilizes a set of detection rules to detect the predefined attack.

4. The method of claim 2, further comprising:
defining a set of detection rules to be applied for detection of attacks executed on cloned versions of monitored systems at the VTE; and
defining an attack catalog associated with the VTE, wherein the attack catalog includes a set of attacks associated with the cloned versions of the monitored system at the VTE, wherein the set of detection rules is associated with the defined attacks at the attack catalog, wherein the SMS detects attacks and threats to cloned versions of systems at the VTE, and wherein the VTE is a cloud based environment where physical and cloud instances of the systems are simulated.

5. The method of claim 1, further comprising:
measuring an efficiency rate of the SMS based on the execution result of the predefined attack.

6. The method of claim 1, wherein performing the logic modifications includes:
performing logic adjustments to detection logic of the SMS, wherein the logic adjustments include defining of new detection rules in relation to the predefined attack.

7. The method of claim 6, further comprising:
implementing additional protection logic to the protection logic defined by the cloned version of the monitored system to improve security protection.

8. The method of claim 6, further comprising:
determining whether an improved SMS efficiency rate is achieved by the SMS based on the performed logic modifications.

9. The method of claim 8, wherein determining whether the improved SMS efficiency rate is achieved to include:
performing a test simulation of the predefined attack against the cloned version of the monitored system after the logic adjustments are performed on the SMS.

10. A computer system to improve detection of security incidents, comprising:
a processor;
a memory in association with the processor storing instructions related to:
instantiate a virtual testing environment (VTE) for automated measurement of performance of a security monitoring system (SMS);
execute a predefined attack against a cloned version of a monitored system in the VTE;
based on a result of execution of the predefined attack, measure a detection rate of the predefined attack by the SMS at the VTE; and
based on the result of execution of the predefined attack, measure a protection level of the cloned version of the monitored system;
based on the detection rate and the protection level, determine an action for improving protection of the monitored system; and
based on the determined action, perform logic modifications on the SMS, where the logic modifications are associated with improved detection of security incidents, and wherein the logic modifications include defining new detection rules in relation to the predefined attack.

11. The system of claim 10, wherein the instructions stored at the memory further comprise instructions to:
define a set of detection rules to be applied for detection of attacks executed on cloned versions of monitored systems at the VTE; and
define an attack catalog associated with the VTE, wherein the attack catalog includes a set of attacks associated with the cloned versions of the monitored system at the VTE, wherein the set of detection rules is associated with the defined attacks at the attack catalog,
wherein the SMS detects attacks and threats to cloned versions of systems at the VTE.

12. The system of claim 10, further comprising instructions to:
measure an efficiency rate of the SMS based on the execution result of the predefined attack.

13. The system of claim 10, further comprising instruction to:
implement additional protection logic to the protection logic defined by the cloned version of the monitored system.

14. The system of claim 13, further comprising instructions to:
determine whether an improved SMS efficiency rate is achieved by the SMS based on the performed logic modifications; and
perform a test simulation of the predefined attack against the cloned version of the monitored system after the security measures are performed on the cloned version of the monitored system and on the SMS.

15. A non-transitory computer-readable medium storing instructions, which when executed cause a computer system to:
execute a predefined attack against a cloned version of a monitored system in a virtual testing environment (VTE);
based on a result of execution of the predefined attack, measure a detection rate of the predefined attack by a security monitoring system (SMS) at the VTE; and
based on the result of execution of the predefined attack, measure a protection level of the cloned version of the monitored system;
based on the detection rate and the protection level, determine an action for improving protection of the monitored system; and
based on the determined action, perform logic modifications on the SMS, where the logic modifications are associated with improved detection of security incidents.

16. The computer-readable medium of claim 15, further storing instructions to:
instantiate the VTE for automated measurement of performance of the SMS.

17. The computer-readable medium of claim 15, further storing instructions to:

define a set of detection rules to be applied for detection of attacks executed on cloned versions of monitored systems at the VTE; and define an attack catalog associated with the VTE, wherein the attack catalog includes a set of attacks associated with the cloned versions of the monitored system at the VTE, wherein the set of detection rules is associated with the defined attacks at the attack catalog, wherein the SMS detects attacks and threats to cloned versions of systems at the VTE.

18. The computer-readable medium of claim 15, further storing instructions to:

measure an efficiency rate of the SMS based on the result of execution of the predefined attack.

19. The computer-readable medium of claim 15, wherein the instructions to perform the logic modifications associated with security improvement include defining of new detection rules in relation to the predefined attack, and further storing instructions to:

implement additional protection logic to the protection logic defined by the cloned version of the monitored system.

20. The computer-readable medium of claim 19, further storing instructions to:

determine whether an improved SMS efficiency rate is achieved by the SMS based on the performed security measures; and perform a test simulation of the predefined attack against the cloned version of the monitored system after the security measures are performed on the cloned version of the monitored system and on the SMS.

* * * * *